United States Patent [19]

Sekiguchi

[11] Patent Number: 4,825,691

[45] Date of Patent: May 2, 1989

[54] METHOD AND APPARATUS FOR DETECTING TROUBLE IN PULSE GENERATORS

[75] Inventor: Akira Sekiguchi, Higashimatsuyama, Japan

[73] Assignee: Diesel Kiki Co., Ltd., Japan

[21] Appl. No.: 215,968

[22] Filed: Jul. 7, 1988

[30] Foreign Application Priority Data

Jul. 10, 1987 [JP] Japan .................................. 62-170894

[51] Int. Cl.[4] .......................................... G01M 15/00
[52] U.S. Cl. .................................... 73/118.1; 123/479
[58] Field of Search ................... 73/119 A, 117.3, 116, 73/1 R, 5, 118.1; 340/514; 375/10; 364/183, 486; 123/479

[56] References Cited

U.S. PATENT DOCUMENTS 4,395,905 8/1983 Fujimori et al. .

4,759,212 7/1988 Sawada et al. ...................... 73/118.1

Primary Examiner—Jerry W. Myracle
Attorney, Agent, or Firm—Pollock, Vande Sande & Priddy

[57] ABSTRACT

A trouble detecting method and apparatus for detecting trouble in either of a first pulse generator for generating first pulses and a second pulse generator for generating N second pulses between each pair of successive first pulses. The number of the second pulses produced between each pair of successive first pulses is repeatedly counted and it is detected whether or not the result of the count is cyclically more than a first predetermined value and whether or not the maximum count cyclically reaches a second predetermined value. On the basis of the results of the detections the determination is made as to whether either of the pulse generators has malfunctioned and if so which.

7 Claims, 4 Drawing Sheets

METHOD AND APPARATUS FOR DETECTING TROUBLE IN PULSE GENERATORS

BACKGROUND OF THE INVENTION

1. Field of the Invention

The present invention relates to a method and apparatus for detecting trouble in either of pair of pulse generators.

2. Description of the Prior Art

In an internal combustion engine, when for example, the quantity and or timing of fuel injection by an injection pump is electronically controlled to obtain optimum engine operating conditions, it is essential for the control system to be provided with a reference pulse generator for generating a reference pulse each time the angular position of the rotating shaft of the fuel injection pump or the engine reaches a predetermined reference angular position, such as a position corresponding to the top dead center of a piston, and a cam-pulse generator for generating a cam pulse each time the shaft rotates by a predetermined angle. In such a system, the required fuel control operation is performed taking into account the time of the occurrence of the pulses. Accordingly, appropriate control operation cannot be assured when these pulse generators do not produce the respective pulses appropriately. Thus, there have been proposed various apparatuses for detecting trouble in pulse generators of this kind.

In U.S. Pat No. 4,395,905, for example, there is proposed a trouble detecting apparatus suitable for use with this kind of pulse generator. When pulses are not produced continuously by one or the other of the generators, the disclosed apparatus detects this trouble using the pulses produced by the other pulse generator. This prior art apparatus is effective for detecting that the pulses are not produced continuously but it is very difficult for it to detect trouble caused by a missing pulser cog of the pulse generator because this kind of trouble does not show up as a series of missing pulsees. The output when the pulser is missing a cog is similar to one including pulse noise, and the prior art apparatus is incapable of distinguising between these two types of trouble.

SUMMARY OF THE INVENTION

It is an object of the present invention to provide an improved trouble detecting method for pulse generators.

It is another object of the present invention to provide such a trouble detecting method in which reliable detection of whether or not the outputs of two pulse generators are normal is realized by having each pulse generator monitor the other.

It is a further object of the present invention to provide an improved trouble detecting apparatus for pulse generators.

It is a still further object of the present invention to provide such a trouble detecting apparatus in which reliable detection of whether or not the outputs of two pulse generators are normal is realized by having each pulse generator monitor the other.

In accordance with a first aspect of the present invention there is provided a trouble detecting method for detecting trouble in either of two pulse generators, one of which is a first pulse generator for generating first pulses according to the rotation of a rotating member and the other of which is a second pulse geneator for generating N second pulses between each pair of successive first pulses, which method comprises the steps of: repeatedly counting the second pulses produced between each pair of successive first pulses; detecting whether or not the result of the count is cyclically more than a first predetermined value; detecting whether or not the maximum count cyclically reaches a second predetermined value; and discriminating from the results of the two detecting steps whether either of the pulse generators has malfunctioned and if so which.

The fact that the counted value is cyclically greater than the first predetermined value means that the first pulse generator has malfunctioned. On the other hand, the fact that the maximum count does not cyclically reach the second predetermined value means that the second pulse generator has malfunctioned.

According to another aspect of the present invention, in a trouble detecting apparatus for detecting trouble in two pulse generators, one of which is a first pulse generator for generating first pulses according to the rotation of a rotating member and the other of which is a second pulse generator for generating N second pulses between each pair of successive first pulses, the apparatus has a counting means to which the second pulses are applied as count pulses and the first pulses are applied as reset pulses, a first detecting means for detecting whether or not an over-counting condition wherein the count of the counting menas is more than a predetermined value arises cyclically, and a second detecting means for detecting whether or not an under-counting condition wherein the maximum count of the counting means is less than the predetermined value arises cyclically.

The counting means counts the number of the second pulses applied thereto until it is reset by the application of a first pulse thereto. Therefore, if the pulse generator operates normally, the count is repeated, for example, from zero to N. That is, the count periodically reaches the predetermined level, so that neither over-counting nor under-counting condition occurs periodically.

The detection results of the first and second detecting means are applied to a discriminating means. Based on the detection result of the first detecting means, the discriminating means determines that the first pulse generator has malfunctioned when cyclical occurrence of the over-counting condition of the counting means is detected by the first detecting means. The discriminating means is also responsive to the detection result of the second detecting means and when cyclical occurrence of the under-counting condition of the counting means is detected by the second detecting means, the discriminating means determines that the second pulse generator has malfunctioned. The result of the determination by the discriminating means can be indicated by an indicating means, such as lamp, buzzer or the like.

The periodical occurrence of the over-counting condition of the counting means may happen when, for example, the pulser of the first pulse generator has lost one of its cogs, because in such case the resetting of the counting means is not carried out in accordance with the predetermined timing. On the other hand, the periodical occurrence of the under-counting condition of the counting means may happen when, for example, the second pulse generator has lost one of its cogs, because in such case it periodically occurs that the counting means is reset before the count has reached the predetermined value.

However, since the over-counting and under-counting condition never happen cyclically in the case of a transient counting error, which may be caused by noise or the like, malfunction of the pulse generators can be clearly distinguished from the transient erroneous operation due to noise signals or the like.

The invention will be better understood and the other objects and advantages thereof will be more apparent from the ensuing detailed description of a preferred embodiment taken in conjunction with the drawings.

DESCRIPTION OF THE PREFERRED EMBODIMENT

Figure 1:
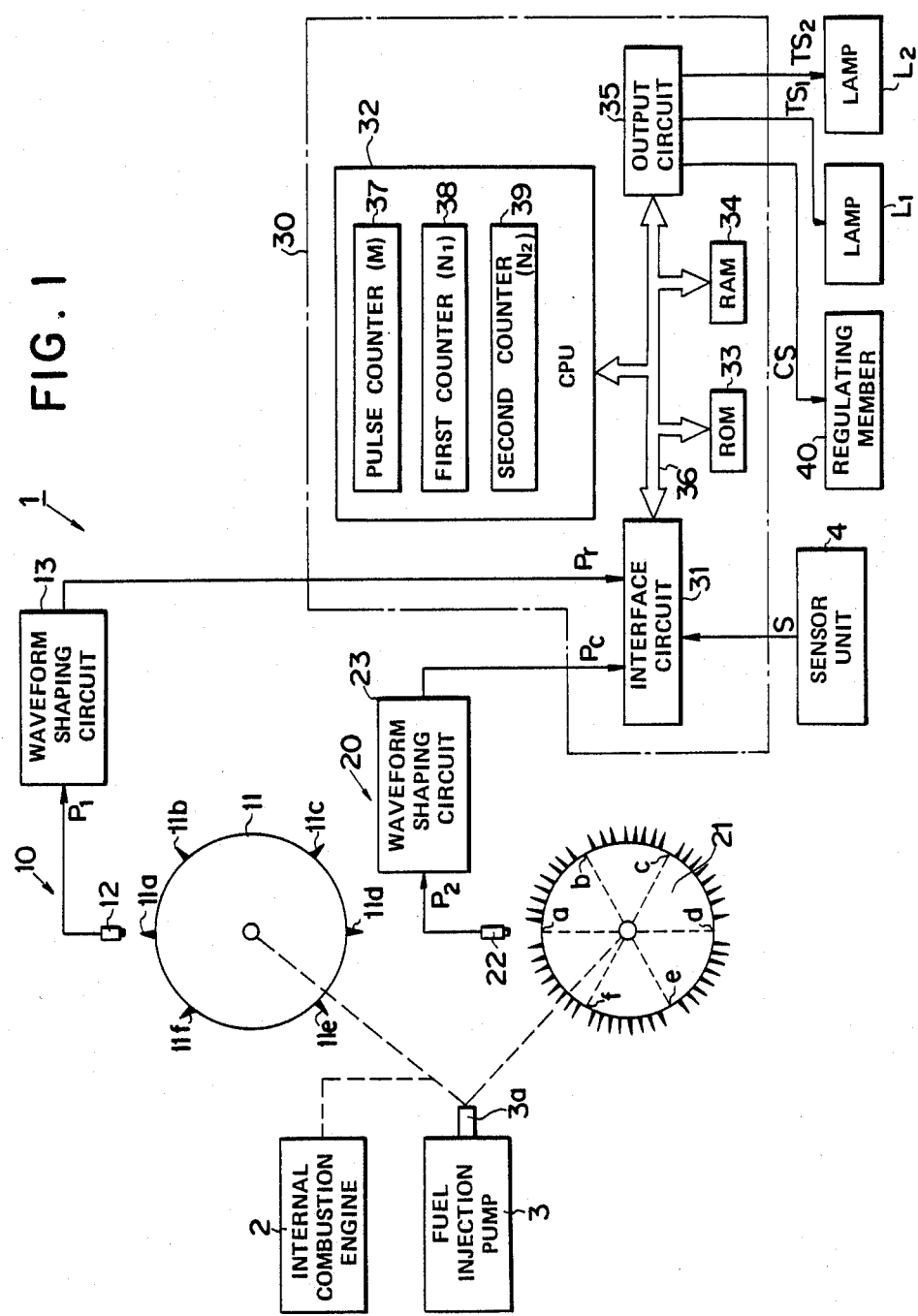
FIG. 1 is a block diagram showing one embodiment of an internal combustion engine control system including a trouble detecting apparatus according to the present invention.

The internal combustion engine control system 1 shown in FIG. 1 includes a fuel injection pump 3 for injecting fuel into an engine 2, and serves to electronically control the operation of the engine 2. The system 1 further comprises a first pulse generator 10 for generating pulse signals when the angular position of a drive shaft 3a of the fuel injection pump 3 reaches predetermined reference angular positions, and a second pulse generator 20 for generating a predetermined number of pulse signals while the drive shaft 3a rotates from one reference angular position to the subsequent reference angular position.

Figure 2A:
FIGS. 2A and 2B are waveforms of the output pulses from pulse generators shown in FIG. 1.

In the embodiment shown in FIG. 1 the internal combustion engine 2 is a four-cycle, six-cylinder engine, and the first pulse generator 10 has a first pulser 11 which is secured to the drive shaft 3a and has six cogs 11a to 11f spaced at 60 degrees interval about its outer periphery. The first pulse generator 10 has a first sensor coil 12 located adjacent to the first pulser 11 to that the six cogs 11a to 11f first approach and then depart from the first sensor coil 12 in sequence with the rotation of the drive shaft 3a. As a result, a pulse $P_1$ is produced by the first sensor coil 12 each time one of the cogs of the first pulser 11 comes opposite the first sensor coil 12. Since the first pulser 11 is secured to the drive shaft 3a in such a way that one of the cogs comes opposite the first sensor coil 12 at the time a corresponding piston of the engine 2 reaches its compression top dead center, a pulse $P_1$ is produced each time one of the six pistons of the engine 2 reaches its compression top dead center. The pulses $P_1$ so produced in sequence are applied to a waveform shaping circuit 13 to obtain square wave reference pulses Pr as shown in FIG. 2A. The reference pulses Pr are sent to a control unit 30.

The second pulse generator 20 has a second pulser 21 which is secured to the drive shaft 3a and has a number of cogs on its outer periphery. In this embodiment the periphery of the second pulser 21 is divided equi-angularly at positions a to f into, e.g. six 60-degree regions corresponding to the location of the cogs 11a to 11f, and eight cogs are provided for each of the six regions. However, the cogs of the second pulser 21 are located so as not to be coincident with the respective positions a to f.

Figure 2B:

The second pulse generator 20 further comprises a second sensor coil 22 located close to the second pulser 21 in such a way that each of the cogs of the second pulser 21 first approaches and then departs from the second sensor coil 22 with the rotation of the drive shaft 3a. The second sensor coil 22 is located in such a way that the positional relationship between the second sensor coil 22 and the drive shaft 3a is the same as that between the first sensor coil 12 and the drive shaft 3a. Thus, with the rotation of the drive shaft 3a, a pulse $P_2$ is produced each time a cog of the second pulser 21 comes opposite the second sensor coil 22 and the pulses $P_2$ are applied to a waveform shaping circuit 23 from which a square-wave pulses as shown in FIG. 2B are output as a cam pulses Pc. The cam pulses Pc are sent to the control unit 30.

As will be understood from the waveform shown in FIGS. 2A and 2B, eight cam pulses are produced from the time one reference pulse Pr is produced to the time the following reference pulse Pr is produced, and no cam pulses is produced at the same time as the occurrence of the reference pulses.

The control unit 30 is responsive to the reference pulses, the cam pulses and a signal produced from a sensor unit 4 for sensing an operating condition of the engine 2. In addition to carrying out electronic fuel control, the control unit 30 also detects whether or not the first pulse generator 10 and the second pulse generator 20 are functioning properly. In this embodiment, the control unit 30 is arranged as a microcomputer device in which a computer program for realizing the control and detection functions is stored and executed.

The control unit 30 has an interface circuit 31 for receiving signals and pulses from outside, a central processing unit (CPU) 32, a read-only memory (ROM) 33 in which prescribed programs are stored, a random access memory (RAM) 34, an output circuit 35, and a bus 36. Data processing operations necessary for preforming the functions of the control unit 30 are executed in the CPU 32 in accordance with the programs stored in ROM 33 in response to the signals and pulses applied through the interface circuit 31. The result of the data processing operation is output as a control signal CS, and first and second detection signals $TS_1$ and $TS_2$ through the bus 36 and the output circuit 35.

The control signal CS is supplied to a regulating member 40 for regulating the supply of fuel to the engine 2. Thus, the operation of the internal combustion engine 2 is electronically controlled in response to the operating condition of the engine indicated by the signal S. The first detection signal $TS_1$ is produced when malfunction of the first pulse generator 10 is detected and a lamp $L_1$ is lit in response to the application of the first detection signal $TS_1$. The second detection signal $TS_2$ is produced when malfunction of the second pulse generator 20 is detected and a lamp $L_2$ is lit in response to the application of the second detection signal $TS_2$.

A description will now be given in conjunction with FIGS. 3 to 5 of the program stored in the ROM 33.

Figure 3:
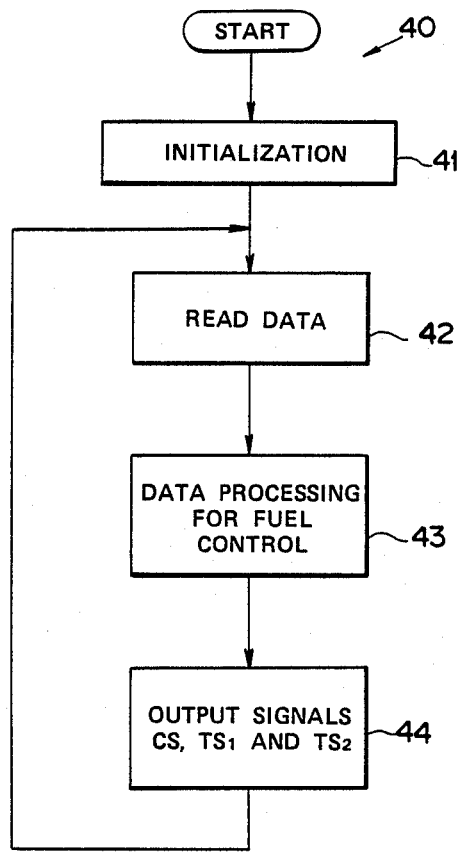
FIG. 3 is the flowchart of a main control program executed in the central processing unit shown in FIG. 1.

In the main control program shown in FIG. 3, initialization of the program is executed in step 41 after the start of the program, and the operation then moves to step 42 wherein necessary data for control is read in. After this, the operation moves to step 43 in which the data processing for effecting the fuel control for the engine 2 is executed on the basis of the data read in step 42 and the resulting control signal CS is output in step 44. Steps 42 to 44 are thereafter repeatedly executed, whereby the fuel control for the engine 2 is electronically carried out in response to the detected operaitng condition of the engine 2.

Programs INT1 and INT2 which are executed in interrupt mode in response to the reference pules Pr and the cam pulses Pc, respectively, are further stored in ROM 30 of the control unit 30. The programs INT1 and INT2 are related to each other, and the data processing for discriminating whether or not the respective pulse generators are operating properly are executed in response to the reeference pulses Pr and the cam pulses Pc in accordance with the programs INT1 and INT2.

The data processing operation for discriminating the absence or presence of a malfunction in the pulse generators 10 and 20 will be described with reference to FIGS. 4 and 5. These two programs INT1 and INT2 discriminate the presence/absence of malfunction on the basis of the count M of a pulse counter 37, the count $N_1$ of a first counter 38 and the count $N_2$ of a second counter 39. The said counters are themselves realized by the programs INT1 and INT2. The count M of the pulse counter 37 is incremented by one in response to the occurrence of the cam pulse Pc and the pulse counter 37 is reset in response to the reference pulse Pr. The counts $N_1$ and $N_2$ of the first and second counters 38 and 39 are set at the respective initial values at the initialization operation in step 41 of the main control program 40 and the discrimination of the presence/absence of malfunction of the pulse generator 10 and 20 is carried out on the basis of the counts $N_1$ and $N_2$. As mentioned above, the pulse counter 37, the first counter 38 and the second counter 39 are formed by the program so as to perform these counting functions and the control unit 30 is conceptually provided with them. Accordingly, these counters are indicated in the control unit 30 of FIG. 1 in the form of a block.

Figure 4:
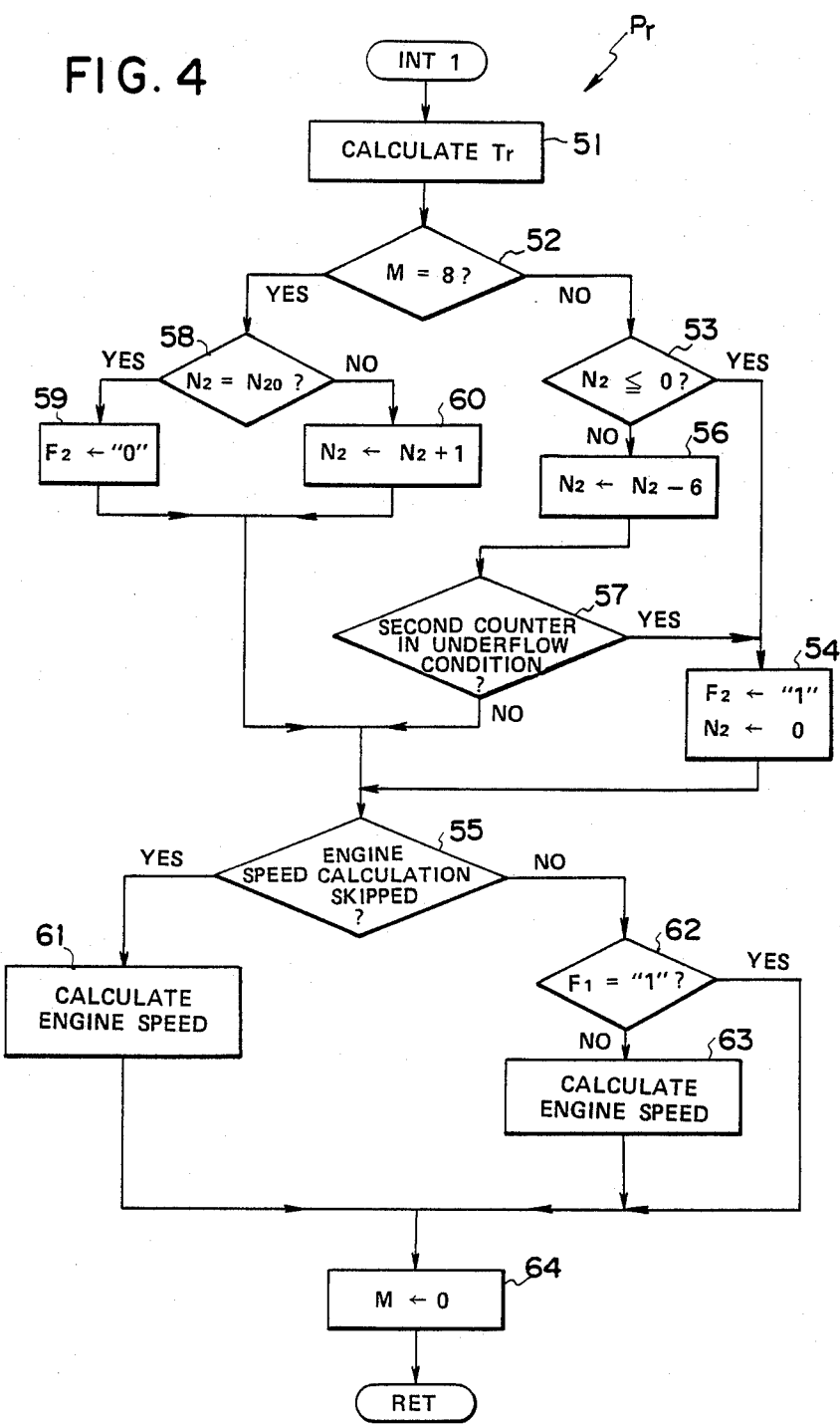
FIGS. 4 and 5 are flowcharts of programs executed in the central processing unit shown in FIG. 1, for detecting trouble in the pulse generators shown in FIG. 1.
Figure 5:
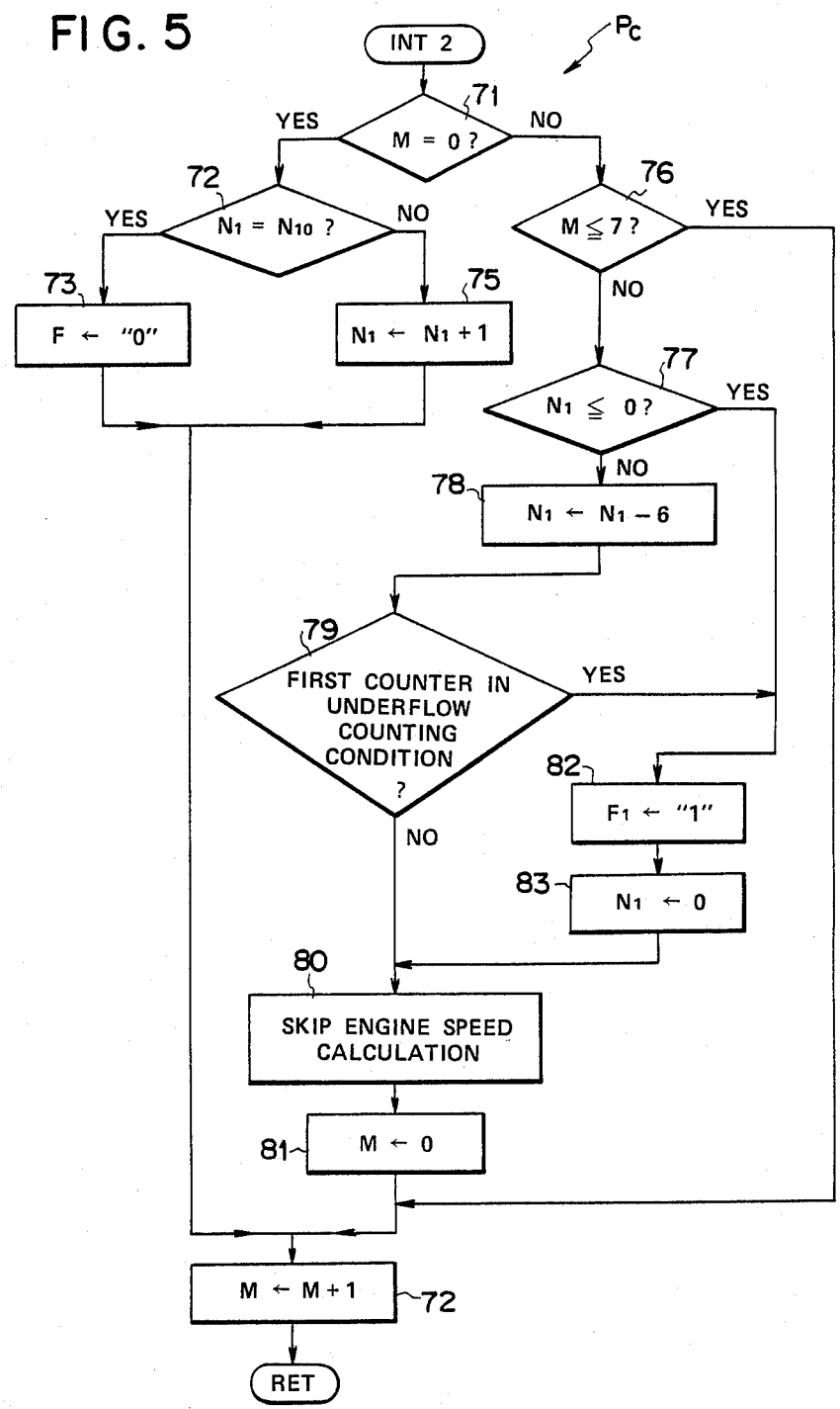

Execution of the program INT1 shown in FIG. 4 is triggered in response to the input of the reference pulse Pr. After execution has begun, the period Tr between the reference pulses Pr is calculated in step 51 and at the end of the calculated period the operation moves to step 52 in which it is discriminated on the basis of the count M whether or not eight can pulses Pc have been counted up to that time.

When the discrimination in step 52 is No because, for example, the first pulser 11 is missing a cog, the operation moves to step 53 in which the discrimination is made as to whether or not the count $N_2$ of the second counter 39 is not more than zero. As described later, the second counter 39 operates in such a way that a negative count $N_2$ is not established when the cam pulses Pc are produced normally. When the count $N_2$ is less than zero because of an abnormality in the production of the cam pulses Pc, the discrimination in step 53 becomes YES and then step 54 is executed. In step 54 a flag $F_2$ for indicating malfunction of the second pulse generator 20 is set and the second counter 39 is reset to make the count $N_2$ zero. Then, step 55 is executed after the execution of step 54.

On the other hand, when the discrimination in step 53 becomes NO, that is, when the count $N_2$ still remains zero or a positive value while fewer than eight cam pulses Pc were detected in step 52, the operation moves to step 56 in which six (the number of first pulser 11 cogs) is subtracted from the count $N_2$. Thus, the count $N_2$ is replaced by $N_2-6$. The operation then moves to step 57, where discrimination is made as to whether or not the second counter 39 is in underflow counting condition due to the operation of $N_2-6$. When the result of the discrimination in step 57 becomes YES, the operation moves to step 54. When NO, the operation moves to step 55.

When the discrimination in step 52 in YES, the operation moves to step 58 in which discrimination is made as to whether or not the count $N_2$ of the second counter 39 is equal to its initial set value $N_{20}$. When the discrimination in step 58 is YES, the operation moves to step 59 in which a flag $F_2$ is reset. After this the operation moves to step 55. When the discrimination in step 58 is NO, $N_2$ is replaced by $N_2+1$ in step 60 and then the operation moves to step 55.

Discrimination is made in step 55 as to whether or not the calculation of engine speed was skipped, and when the result in step 55 is YES, the operation moves to step 61 in which the skip condition of the engine speed calculation is canceled. When the discrimination in step 55 is NO, the operation moves to step 62 in which discrimination is made on the basis of a falg $F_1$ mentioned hereinafter as to whether or not the first pulse generator 10 has malfunctioned. The operation moves to step 64 when the discrimination in step 62 is YES or the flag $F_1$ is set. On the other hand, when NO, the engine speed is calculated in step 63 on the basis of the result of the calculation in step 51 and the operation moves to step 64.

In step 64, the pulse counter 37 is reset to make the count M zero, and the operation returns to the main control program 40.

As described above, according to the program INT1, it is checked in step 53 whether or not the count $N_2$ is less than zero when a shortage of cam pulses PC is detected in step 52. In the first case where a shortage of cam pulses Pc is detected, the count $N_2$ should be more than zero because an initial value $N_{20}$ of more than zero is set as the count $N_2$, and the count $N_2$ is replaced by the result of the calculation $N_2-6$ in step 56. After this, it is discriminated in step 57 whether or not the second counter 39 is in underflow counting condition on the basis of the count $N_2$ at that time. When the second counter 39 is in underflow counting condition, the flag $F_2$ indicating malfunction of the second pulse generator 20 is set in step 54. When the second counter 39 is not put in underflow counting condition by the calculation $N_2-6$ executed in step 56, the flag $F_2$ is not set.

On the other hand, when M=8 at the time of the occurrence of the reference pulses Pr, the second counter 39 is incremented by one and $N_2$ is replaced by $N_2+1$ in step 60.

As described above, the number of cam pulses Pc is checked at each occurrence of the reference pulse Pr, whereafter the count $N_2$ of the second counter 39 is reduced by six when a shortage of the cam pulses Pc is detected and is increased by one when no shortage of the cam pulses Pc is detected. In addition, the initial set value $N_{20}$ of the second counter 39 is preferably set at more than 6.

As a result, in the case where the shortage of the cam pulses Pc is transient even when step 56 is executed, step 60 will thereafter be executed repeatedly without the execution of step 56, so that the flag $F_2$ will be not set. The reliability of this operation can be made very high by setting the second counter at a relatively large initial value and making the capacity of the second counter 39 large.

In contrast, the count $N_2$ is decreased by six when the first reference pulse Pr is produced after a shortage of cam pulses Pc arises because of a missing cog of cogs in one region of the second pulser 21, and the count $N_2$ is increased by five when the succeeding five reference pulses Pr are produced thereafter. Thus, the count $N_2$ is decremented by one for each rotation of the drive shaft 3a, so that it cyclically occurs that the count M does not reach eight. As a result, step 54 is executed without fail. As described above, the case of a missing cog or cogs in the second pulser 21 is clearly distinguishable from a transient erroneous operation caused by a noise signal or the like.

The operation according to program INT2 shown in FIG. 5 will now be explained. When the operation of the program INT2 starts in response to the occurrence of the cam pulse Pc, it is first discriminated in step 71 whether or not the count M is zero. The discrimination in step 71 becomes YES when $M=0$, and the operation moves to step 72 in which discrimination is made as to whether or not the count $N_1$ of the first counter 38 is equal to its initial set value $N_{10}$. In the case where the cam pulse Pc used for starting the execution of the program INT2 is one produced just after the occurrence of the reference pulse Pr, the discrimination in step 72 becomes YES and the operation moves to step 73, in which the flag $F_1$ is reset. The set state of the flag $F_1$ indicates malfunction of the first pulse generator 10. After the execution of step 73, the count M is incremented by one to replace M by $M+1$ in step 74 and the operation returns to the main control program 40. When the discrimination in step 72 is NO, the operation moves to step 75 in which the first counter 38 is counted up by one. After this, step 74 is executed.

At the start of the execution of the program INT2, when $M \neq 0$ because the count of the pulse counter 37 has been raised by the preceding cam pulse Pc, the discrimination in step 71 becomes NO, and the operation moves to step 76, where discrimination is made as to whether or not the count M is seven or less. The discrimination in step 76 becomes YES when $M \leq 7$, and the operation moves to step 74 wherein the count M is incremented by one.

When $M > 7$, the discrimination in step 76 becomes NO, and the operation moves to step 77. The condition of $M > 7$ occurs when, for example, the reference pulse Pr is not produced at the predetermined timing or a noise pulse similar to the reference pulse Pr is produced. In step 77, discrimination is made as to whether or not the count $N_1$ is zero or less. The discrimination in step 77 becomes NO when $N_1 > 0$, and the count $N_1$ is decreased by six in step 78.

After this, discrimination is made in step 79 as to whether or not the first counter 38 is in the underflow counting condition. The set operation for skipping the engine speed calculation is carried out in step 80 when the discrimination in step 79 becomes NO. Then, the pulse counter 37 is reset to make the count M zero in step 81 and the operation moves to step 74.

When the discrimination in step 77 or 79 becomes YES, the operation moves to step 82 in which the flag $F_1$ is set to indicate malfunction of the first pulse generator 10. After this, the first counter 38 is reset to make the count $N_1$ zero in step 83 and the operation moves to step 80.

As will be understood from the foregoing description, in the case where eight cam pulses Pc are produced after the production of a reference pulse Pr, the second counter 39 is incremented by one in step 60 for each occurrence of the reference pulse Pr. Consequently, the second counter does not assume underflow counting condition so long as the normal condition described above is repeatedly continued, so that step 54 is never executed.

If the second pulser 21 of the second pulse generator 20 should lose a cog, the discrimination in step 52 becomes NO once per six executions of the program INT1 during one rotation of the drive shaft 3a. Thus, since the count $N_2$ is decremented by one for each rotation of the drive shaft 3a, underflow counting operation of the second counter 39 is reliably established when the second pulser 21 is missing a cog. This causes the flag $F_2$ to be set in step 54, whereby the second detection signal $TS_2$ is produced in step 44 of the main control program to light the lamp $L_2$. (see FIG. 1).

A description will be now given of the operation for detecting malfunction of the first pulse generator 10 for generating the reference pulse Pr. Since the pulse counter 37 is reset in response to the reference pulse Pr to make the count M zero in step 64, in the case of normal condition, the count M is incremented by one for each cam pulse Pc and the count M reaches 7 at the execution of step 76 of program INT2 executed in response to the 8th cam pulse Pc counting from the cam pulse produced just after the reference pulse Pr. That is, the count M should be always less than 8 at step 76 in the case of the no malfunction. It can be assumed that the first pulser 11 of the first pulse generator 10 is missing a cog when the condition $M > 7$ occurs periodically.

In order to detect malfunction of the first pulse generator 10 due to a missing cog by utilizing this fact, the count $N_1$ of the first counter 38 is incremented by one in step 75 when the count M is zero, and the count of the first counter 38 is decreased by 6 in step 78 each time an abnormal condition is detected in step 76. Thus, when the first counter 38 assumes underflow counting condition, steps 82 and 83 are executed to set flag $F_1$. The first detection signal $TS_1$ is produced in step 44 of the main control program 40 in response to the set operation of the flag $F_1$ and the lamp $L_1$ is turned on.

Although the description of the present invention is given on the basis of one embodiment, the present invention is not limited thereto. For example, the present invention can alternatively be realized by the use of a logic circuit and or an analog circuit, without use of a microcomputer.

Furthermore, the described embodiment is for detecting of malfunction of pulse signal generators used in a system for controlling an internal combustion engine. However, the present invention is not limited to this application and can be used in various other applications as well.

In the embodiment described above, the count $N_1$ of the first counter 38 is controlled on the basis of the count M in such a way that the count $N_1$ is increased by one when the count M is normal and is reduced by six when the count M is abnormal. The count $N_2$ of the second counter 39 is similally controlled. However, the present invention is not limited to this arrangement. For example, the count $N_1$ or $N_2$ may be decreased by one when a normal count M is obtained, and the count $N_1$ or $N_2$ may be increased by a predetermined value when an abnormal count M is obtained. In this case, it follows that the first or second counter assumes overflow counting condition when a malfunction occurs in the pulse generators.

I claim:

1. A trouble detecting apparatus for detecting trouble in either of two pulse generators, one of which is a first pulse generator for generating first pulses according to the rotation of a rotating member and the other is a second pulse generator for generating N second pulses between each pair of successive first pulses, said apparatus comprising:
- a counting means to which the second pulses are applied as count pulses and the first pulse are applied as reset pulses;
- a first detecting means for detecting whether or not an over-counting condition wherein the count of the counting means is more than a predetermined value arises cyclically;
- a second detecting means for detecting whether or not an under-counting condition wherein the maximum count of the counting means is less than the predetermined value arises cyclically; and
- a discriminating means responsive to said first and second detecting means for determining whether either of the pulse generators has malfunctioned and if so which.

2. An apparatus as claimed in claim 1 wherein said discriminating means has a first means responsive to said first detecting means for outputting first data indicating a malfunction of the first pulse generator when the over-counting condition arises cyclically, and a second means responsive to said second detecting means for outputting second data indicating a malfunction of the second pulse generator when the under-counting condition arises cyclically.

3. An apparatus as claimed in claim 1 wherein said first detecting means has a first check means for discriminating whether or not the counting menas has assumed the over-counting condition, a reset means responsive to the first check means for resetting the counting means when the over-counting condition is detected, a first counter which is controlled so as to count up by a first fixed value when it is confirmed in response to the first check means that the over-counting condition has not occurred and so as to count down by a second fixed value greater than the first fixed value when it is confirmed in response to the first check means that the over-counting condition has occurred, and means for detecting whether or not the count of the first counter has assumed the underflow counting condition.

4. An apparatus as claimed in claim 1 wherein said first detecting means has a first check means for discriminating whether or not the counting means has assumed the over-counting condition, a reset means responsive to the first check means for resetting the counting means when the over-counting condition is detected, a first counter which is controlled so as to count down by a first fixed value when it is confirmed in response to the first check means that the over-counting condition has not occurred and so as to count up by a second fixed value greater than the first fixed value when it is confirmed in response to the first check means that the over-counting condition has occurred, and means for detecting whether or not the count of the first counter has assumed the overflow counting condition.

5. An apparatus as claimed in claim 1 wherein said second detecting means has a second check means for discriminating whether or not the counting means is the under-counting condition at the time of the occurrence of the first pulse, a second counter which is controlled so as to count by a third fixed value when it is confirmed in response to the second check means that the under-counting condition has not occurred and so as to count down by a fourth fixed value greater than the third fixed value when it is confirmed in response to the second check means that the under-counting condition has occurred, and means for detecting whether or not the count of the second counter has assumed the underflow counting condition.

6. An apparatus as claimed in claim 1 wherein said second detecting means has a second check means for discriminating whether or not the counting means is the under-counting condition at the time of the occurrence of the first pulse, a second counter which is controlled so as to count down by a third fixed value when it is confirmed in response to the second check means that the under-counting condition has not occurred and so as to count by a fourth fixed value greater than the third fixed value when it is confirmed in response to the second check means that the under-counting condition has occurred, and means for detecting whether or not the count of the second counter has assumed the overflow counting condition.

7. A method for detecting trouble in either of two pulse generators, one of which is a first pulse generator for generating first pulses according to the rotation of a rotating member and the other is a second pulse generator for generating N second pulses between each pair of successive first pulses, said method comprising the steps of:
- repeatedly counting the second pulses produced between each pair of successive first pulses;
- detecting whether or not the result of the count is cyclically more than a first predetermined value;
- detecting whether or not the maximum count cyclically reaches a second predetermined value; and
- discriminating from the results of the two detecting steps whether either of the pulse generators has malfunctioned and if so which.

* * * * *

UNITED STATES PATENT AND TRADEMARK OFFICE
CERTIFICATE OF CORRECTION

PATENT NO. : 4,825,691
DATED : May 2, 1989
INVENTOR(S) : Sekiguchi, Akira

It is certified that error appears in the above-identified patent and that said Letters Patent is hereby corrected as shown below:

Column 9, line 38, change "ornot" to --or not--, and change "menas" to --means--.

Signed and Sealed this

Eighth Day of August, 1989

Attest:

DONALD J. QUIGG

Attesting Officer

Commissioner of Patents and Trademarks